United States Patent [19]

Mayo et al.

[11] Patent Number: 5,285,636
[45] Date of Patent: Feb. 15, 1994

[54] DIAGNOSTIC DRAIN MAST FOR A GAS TURBINE ENGINE

[75] Inventors: Dennis D. Mayo; Ronald A. Janes; Franklin E. Miller, all of Cincinnati, Ohio

[73] Assignee: General Electric Company, Cincinnati, Ohio

[21] Appl. No.: 967,480

[22] Filed: Oct. 28, 1992

[51] Int. Cl.$^5$ .............................................. F02G 3/00
[52] U.S. Cl. ................................................. 60/39.094
[58] Field of Search ............ 60/39.091, 39.094, 39.33; 220/367, 571; 244/129.1, 135 R

[56] References Cited

U.S. PATENT DOCUMENTS

| | | | |
|---|---|---|---|
| 2,814,931 | 12/1957 | Johnson | 60/39.094 |
| 2,949,736 | 8/1960 | Rubbra | 60/39.32 |
| 3,556,444 | 1/1971 | Kopp | 60/39.094 |
| 4,163,366 | 8/1979 | Kent | 60/39.094 |
| 4,437,487 | 3/1984 | Marmon | 137/322 |
| 4,463,774 | 8/1984 | Gorges et al. | 244/129.1 |
| 4,506,851 | 3/1985 | Gupta et al. | 244/129.1 |
| 4,715,561 | 12/1987 | Spinosa et al. | 244/129.1 |
| 5,054,282 | 10/1991 | Costa et al. | 60/39.094 |
| 5,095,617 | 3/1992 | Costa et al. | 60/39.094 |
| 5,104,069 | 4/1992 | Reising | 244/129.1 |

FOREIGN PATENT DOCUMENTS

| | | | |
|---|---|---|---|
| 0453432 | 12/1948 | Canada | 60/39.094 |
| 1294820 | 11/1972 | United Kingdom | 60/39.094 |

Primary Examiner—Richard A. Bertsch
Assistant Examiner—Howard R. Richman
Attorney, Agent, or Firm—Jerome C. Squillaro; John R. Rafter

[57] ABSTRACT

An improved drain mast assembly for a gas turbine engine is connected to an outer surface of a nacelle of the engine and has a plurality of liquid drain lines terminating within the assembly. The assembly comprises a plurality of liquid collection chambers installed within the drain mast assembly with each of the chambers coupled in liquid receiving relationship with a respective one of the liquid drain lines. Each of the chambers collect drain liquid from a respective one of the drain lines. A valve extends from each chamber for selectively draining the collected liquid from each of the chambers for identifying drain lines having relatively high drain-rates. Each of the chambers is separately removable from the drain mast assembly in one form or all chambers may be simultaneously removed in another form of the invention. Each chamber further includes a transparent view window for visually determining a volume of liquid collected by the chamber. The valve in each chamber preferably includes a standpipe extending a preselected distance into the chamber for overflow draining of the chamber when the collected liquid exceeds a predetermined volume.

10 Claims, 4 Drawing Sheets

DIAGNOSTIC DRAIN MAST FOR A GAS TURBINE ENGINE

BACKGROUND OF THE INVENTION

The present invention relates to gas turbine engines and, more particularly, to apparatus for detecting excess leakage of liquids from within a gas turbine engine.

Commercial gas turbine or turbofan engines such as, for example, the type CFM56-5C2 manufactured by General Electric Company, include an extensive liquid drain system for disposing of internally developed leakage liquids and vapors to an area outside the engine, nacelle and pylon cavities. An exemplary system includes drain lines connected to each of a plurality of liquid sources. Typically these sources are located at oil, hydraulic or fuel seal points adjacent to moving elements. For example, one of the sources is located adjacent to the gearbox in the engine where other components are coupled to the engine via shafts passing through the gearbox housing. Other sources are located around hydraulic actuators and fuel driven valves. The drain lines in the aforementioned engine each lead to a drain mast assembly attached to the engine nacelle and arranged to vent the draining liquids outside the nacelle slip stream boundary layer. These drain systems provide an indication of leakage from a source to which the drain is connected but no indication of the quantity or leakage rate of that source. In most commercial engine applications, operational drains drain away liquids that might accumulate during operation and service drains collect liquids for removal during maintenance servicing. Leakage associated with such service drains can be determined during maintenance servicing by measuring the quantity of liquid collected.

A conventional drain mast assembly appears as an air foil shape extending from an outer surface of a nacelle or other engine fairing. The various drain lines feed into the drain mast assembly which then vents the leakage liquid to the atmosphere outside the slip stream boundary layer of the nacelle. Because there are many drain lines connected to the drain mast assembly, it is difficult to determine which particular drain line is leaking liquid because the liquids tend to run onto adjacent drain line openings depending on the attitude of the drain mast and the aerodynamic pressure field on the nacelle. This disadvantage of existing systems creates a problem for troubleshooting a leaking drain and requires an investigation inside the nacelle and cowl assembly, which is a time consuming task.

SUMMARY OF THE INVENTION

It is an object of the present invention to do provide an improved drain mast assembly which incorporates diagnostic means for determining which drain lines have been leaking.

It is another object of the present invention to provide an improved drain mast assembly which provides a determination of leakage rate of particular drains by visual observation.

It is still another object of the present invention to provide a means for determining the identity of leaking drains and the rate of leakage of such drains by allowing draining of a leakage accumulator from outside the nacelle and cowl assemblies.

The above and other objects, features and advantages are achieved in an improved drain mast assembly for a gas turbine engine which incorporates apparatus for collecting, visually inspecting and manually recovering drainage liquid from the engine, nacelle and pylon cavities without the need for opening the cowling, access doors or other service entrances to the engine. In an illustrative form, the drain mast assembly is connected to an outer surface of a nacelle of the engine and includes a plurality of liquid drain lines terminating within the assembly. A plurality of liquid collection chambers are installed within the drain mast assembly with each of the chambers having an inlet coupled in liquid receiving relationship with a respective one of the liquid drain lines. Each of the chambers collects drain liquid from a corresponding one of the drain lines. Each chamber further includes means for selectively draining the collected liquid from the chamber for identifying which of the drain lines has a relatively high drain rate. The collection chambers may be separately removable from the drain mast assembly for repair or for release of a clog in the associated drain lines. The collection chambers may also be removed as a total unit, thereby reducing the number of individual parts.

In a preferred form, each of the collection chambers may include a transparent view window for visually determining a volume of liquid in the collection chamber. The transparent window may be further provided with gradation marks to facilitate quantizing the volume of liquid within the chamber.

Each of the chambers preferably includes a drain comprising a manually operational relief valve having a standpipe extending a preselected distance into the chamber such that an excess of collected liquid may overflow through the standpipe. The standpipe may be slidably extended through a bottom wall of the chamber so that pressing the standpipe into the chamber exposes a hole in the standpipe to allow the liquid accumulated in the chamber to drain outward. The standpipe may be biased in a closed position by a coil spring located in the chamber and positioned to urge the standpipe into a sealing condition.

BRIEF DESCRIPTION OF THE DRAWINGS

For a better understanding of the present invention, reference is made to the following detailed description taken in conjunction with the accompanying drawings in which.

DETAILED DESCRIPTION

Figure 1:
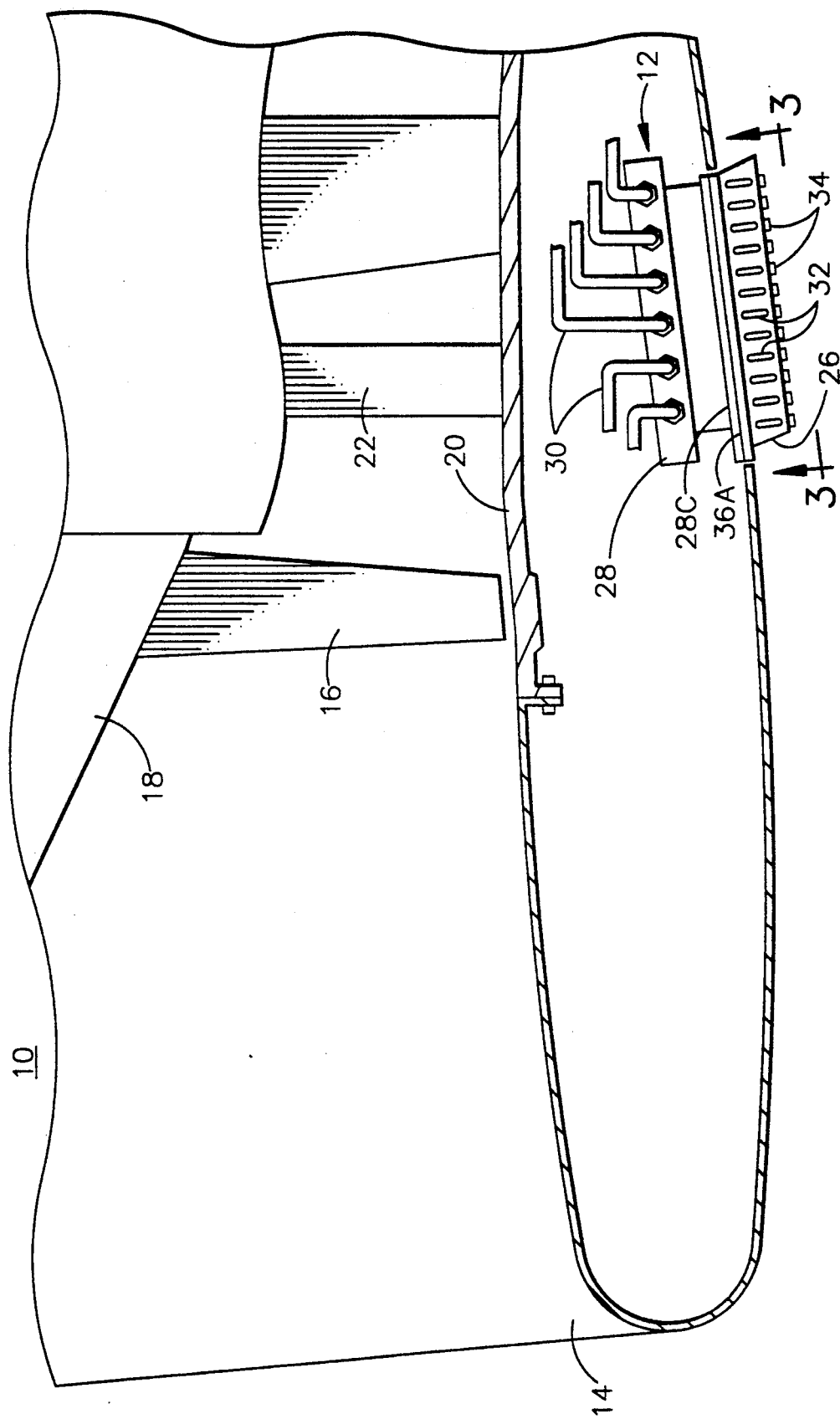
FIG. 1 is a simplified partial cross-sectional view of a forward end of a gas turbine engine indicating the position and location of a drain mast assembly.

Referring now to FIG. 1, there is shown a simplified partial cross-sectional view of a forward portion of a gas turbine engine 10 incorporating a drain mast assembly 12 in accordance with the present invention. For orientation purposes, the following is a brief description of the engine 10. The engine includes an outer nacelle 14 substantially circumscribing the engine and a fan blade assembly represented by blade 16 and a fan blade spinner 18. A fan casing 20 is attached within an inner surface of the nacelle 14 circumscribing at least the fan blade 16. The casing is supported by an inlet guide vane 22 extending from an engine casing 24. The drain mast assembly includes an outer aerodynamically shaped portion 26 and an inner portion 28 to which a plurality of drain lines 30 are connected. In accordance with the present invention, each of the drain lines 30 is coupled to a corresponding one of a plurality of liquid collection chambers located within the outer aerodynamically shaped portion 26. The windows 32 indicate individual collection chambers and are provided to enable visual observation of the level of liquid within any one of the collection chambers. The outer projections 34 from the drain mast assembly portion 26 are combined overflow standpipes and release valve means 34. As described above, the drain lines 30 are connected to various positions within the engine at which different kinds of liquids, for example, hydraulic, oil and fuel, may accumulate. These liquids are desirably drained away from the accumulation areas and either collected to determine the volume of liquid leakage or are directly piped overboard of the engine. The present invention provides a method for accumulating the leakage liquids and for readily determining which particular point has excessive leakage and the volume of leakage from that point.

Figure 2:
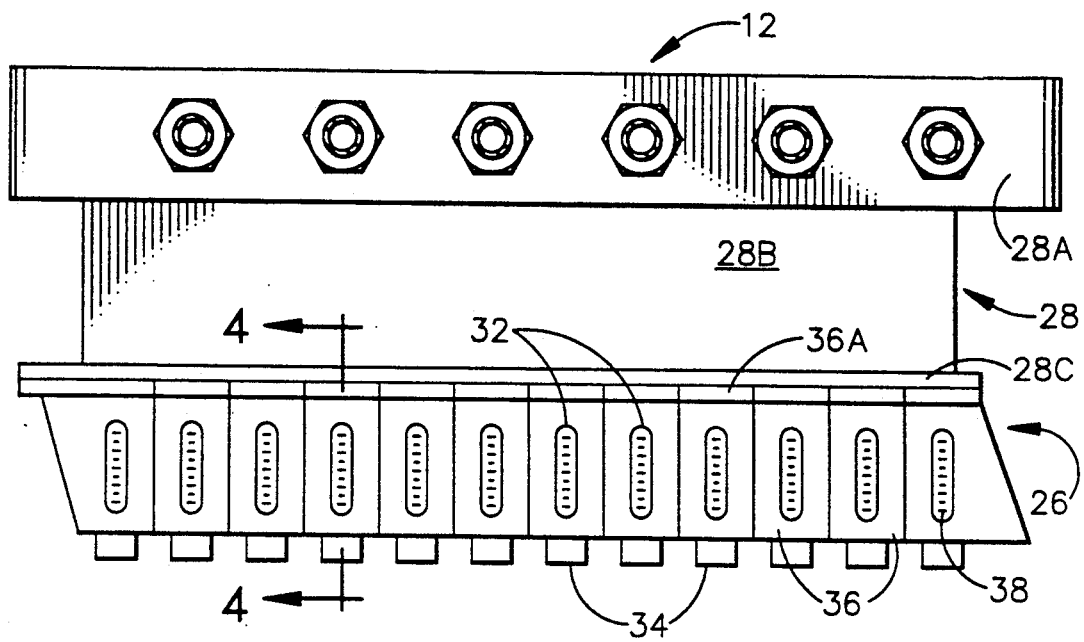
FIG. 2 is an enlarged view of a drain mast assembly in accordance with the present invention.
Figure 3:
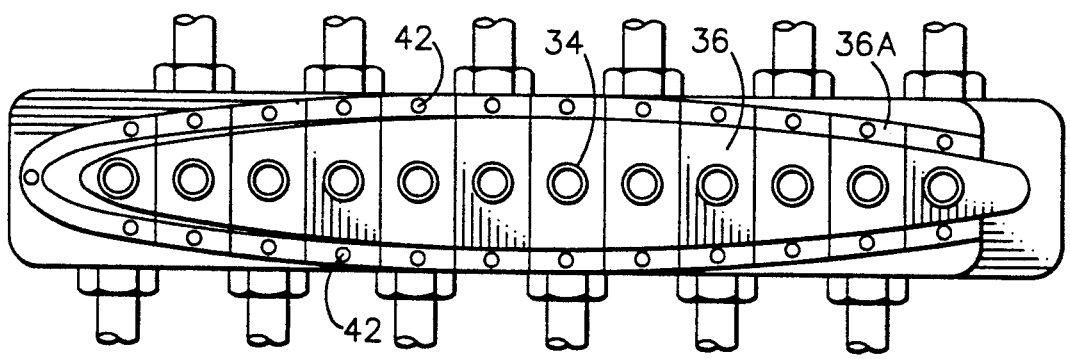
FIG. 3 is a bottom view of the drain mast assembly of FIG. 2.

Referring now to FIGS. 2 and 3, there are shown enlarged views of the drain mast assembly 12 of FIG. 1, the view in FIG. 2 being taken in profile in the manner of FIG. 1 while the view in FIG. 3 is a bottom view of the assembly of FIG. 2. In FIG. 2 and in FIG. 3 it can be seen that each of the collection chambers 36 are individual collection chambers. Preferably, each of the collection chambers may be independently attached to and removed from the drain mast assembly or removed as an assembly for repair or to determine if the collection chamber and its associated drain line has become clogged. The collection chambers may be mounted in any of a number of conventional means such as by screws extending through the chamber and into the drain mast assembly (described below with reference to FIG. 4) or by some form of clamp passing around the collection chambers and attached to the drain mast assembly (described with reference to FIG. 6). As shown in FIG. 2, each of the view windows 32 may also be provided with gradations 38 allowing a visual observation and quantitative evaluation of the volume of liquid leakage to each of the collection chambers. FIG. 3 is a bottom view of the drain mast assembly 12 of FIG. 2 and shows the valve or standpipes 34 extending from the bottom of each of the liquid collection chambers 36. FIG. 3 also illustrated the aerodynamic shape of the drain mast assembly outside of the nacelle 14 and one form of attaching the chambers 36 to mast assembly portion 28 using screws or bolts 42 in a manner to be described hereafter.

Figure 4:
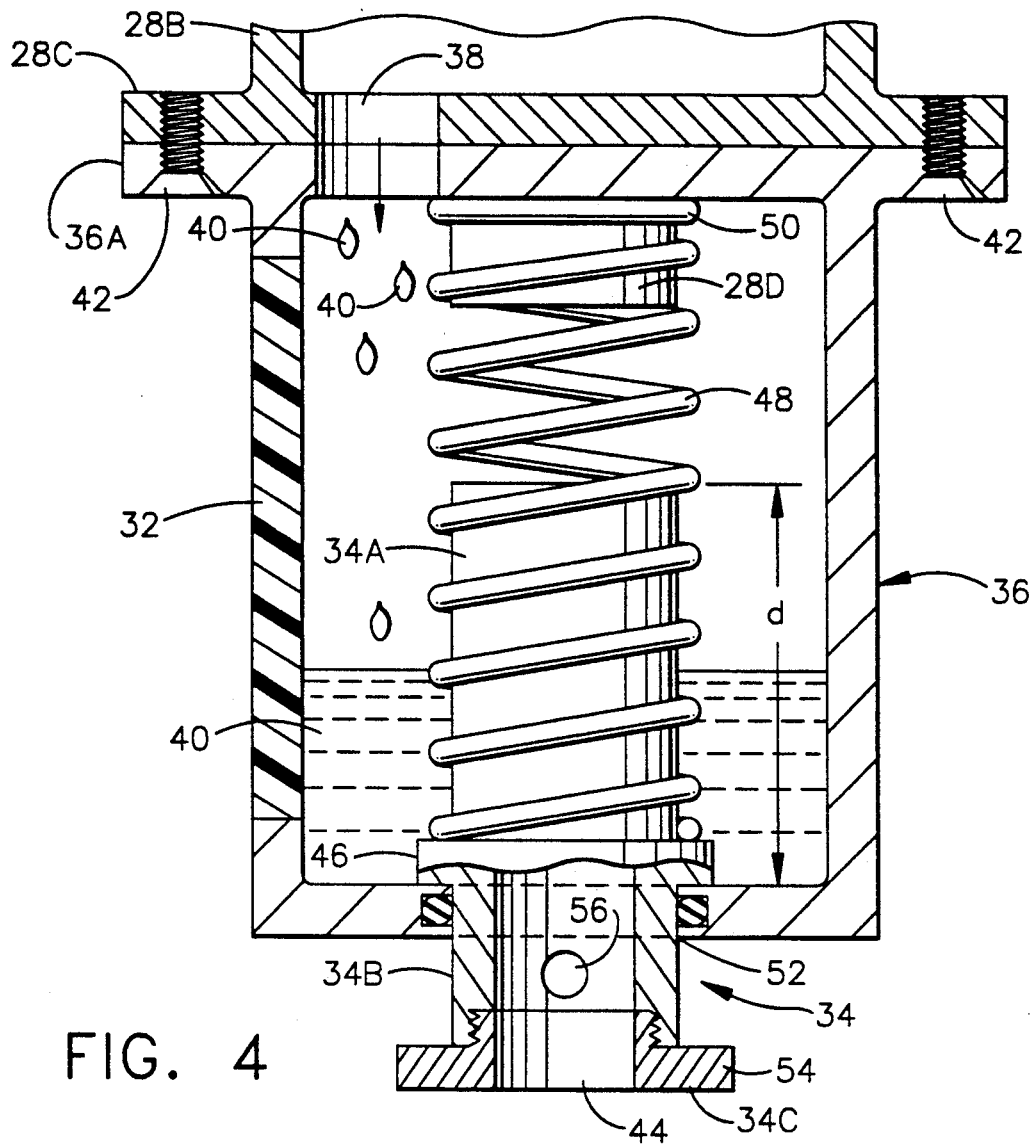
FIG. 4 is a cross-sectional view taken along the lines 4—4 of FIG. 2.

FIG. 4 is a cross-sectional view of an exemplary form of one of the liquid collection chambers 36 taken along the lines 4—4 of FIG. 2. Each chamber 36 overlays an inlet 38 and is positioned for receiving leakage liquid 40 from a respective one of the drain lines 30. Each chamber 36 is formed as a cup-shaped reservoir having outwardly extending flanges 36A at their upper edges. The flanges 36A abut against a mounting flange 28C (also shown in FIG. 2) which is integral with the inner mast assembly portion 28B. The chambers 36 are individually attached to portion 28 by screws 42 passing through flanges 36A and threadedly engaging corresponding holes in flange 28C. The screws 42 may be countersunk for improved aerodynamics.

Figure 5:
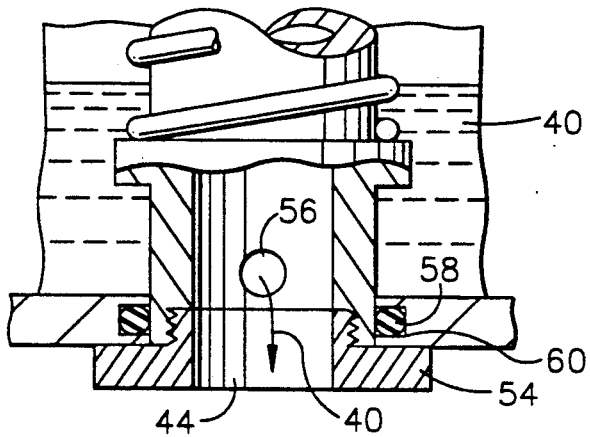
FIG. 5 is a partial cross-sectional view of the collection chamber of FIG. 4 in a drain condition.

Each chamber 36 includes a valve 34 which functions concurrently as a standpipe to allow liquid to drain from the collection chamber if the liquid level within the chamber exceeds a preselected level. In this regard, each standpipe 34 extends a preselected distance, for example, the distance d, into the collection chamber 36. If the liquid level within the collection chamber exceeds the distance d, the liquid flows over the top of the standpipe and down through the hollow interior 44 where it is vented outside of the nacelle. The standpipe 34 has an upper portion 34A which incorporates a lower flange 46. A spring 48 fits over the upper portion 34A of this standpipe and reacts against the flange 46 and against the mounting flange 28C to hold the standpipe in the closed or sealed position as shown in FIG. 4. The spring 48 may be held in position and in alignment with the standpipe portion 34A by a stud 50 extending from the outer surface of flange 28C. The outer portion of the standpipe 34 comprises a section 34B extending from section 34A and fitting through an aperture 52 in the bottom of the chamber 36. The section 34B includes internal threads at its lowest end for threadedly attaching outer flange member 34C. The outer flange member 34C also has a circumferential flange 54 which serves the dual function of preventing the standpipe from being pushed too far into the chamber 36 and also provides a push-point to enable the valve or standpipe 34 to be depressed upward until an aperture 56 in section 34B is exposed within the chamber 36 as shown in FIG. 5. By utilizing the flange 54 to depress the standpipe upward, the user's hand is not saturated with liquid draining through the hollow interior 44.

Figure 7:
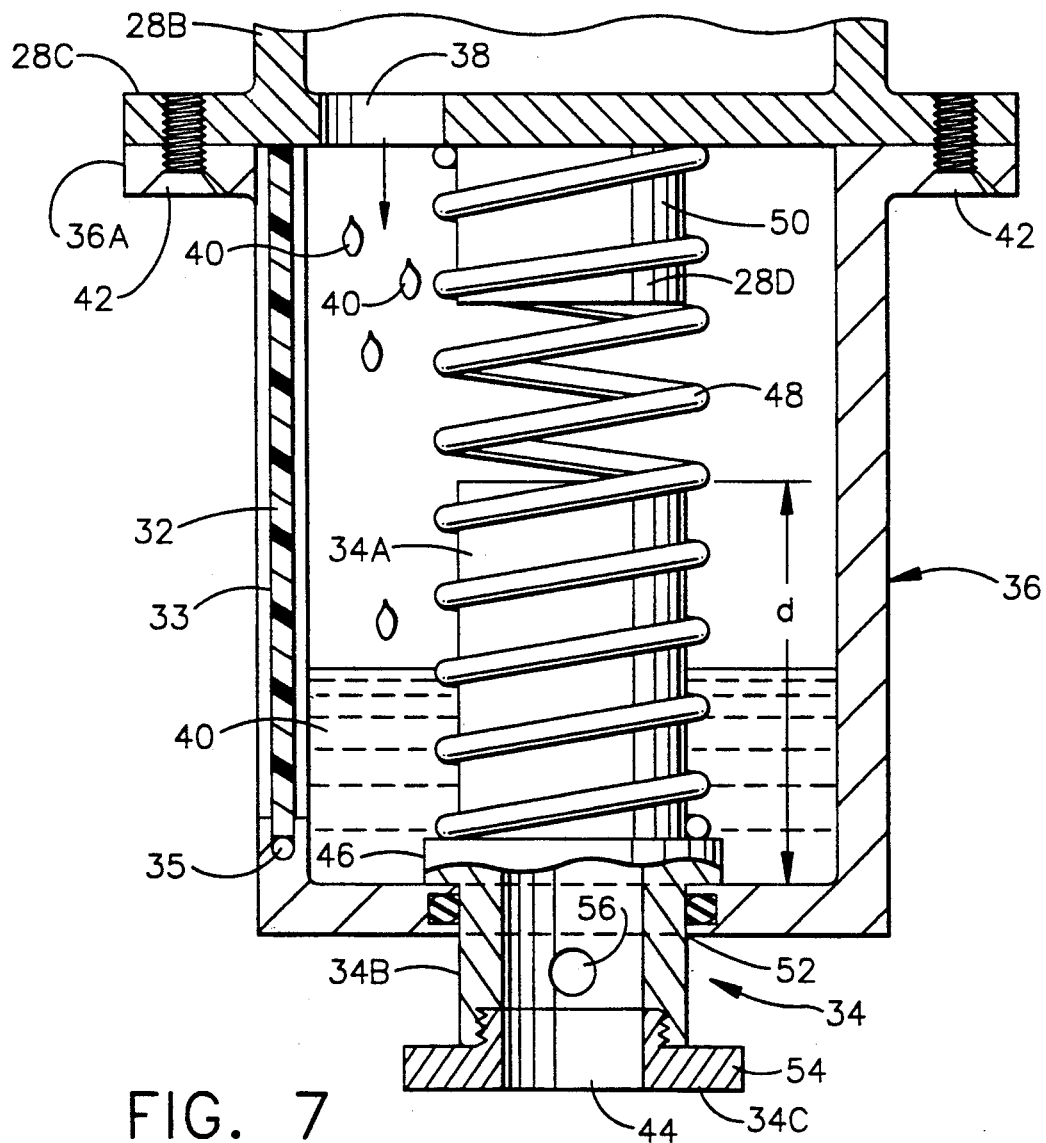
FIG. 7 is still another embodiment of the invention in which the view window is removable.

The viewing windows 32 may be installed in the sides of the chamber 36 by any conventional means. If the chambers 36 are formed of a metal material, the transparent windows may be adhesively bonded to the metal using various forms of adhesive. If the chambers 36 are formed of an aircraft liquids resistant translucent material, the windows 32 may be molded within the chambers as they are formed. Alternatively, the aperture in the chamber 36 in which window 32 fits may extend to the top of the chamber 36, i.e., an aperture may be formed as a slot 33 so that a window 32 may be slid into the slot from the top of the chamber. (See FIG. 7) The slot may be formed with a groove for receiving the window and include a seal 35 to prevent leakage.

Referring briefly to FIG. 5, when the standpipe 34 is pressed upward by engaging the flanges 54, the aperture 56 passing through the standpipe extension 34B is positioned within the chamber and located at a level sufficient to allow liquid 40 accumulated in the chamber to drain out through the standpipe interior 44. A seal such as an O-ring indicated at 58 is positioned in a slot 60 circumscribing the aperture 52 so that the liquid is prevented from leaking out of the chamber 36 around the sides of the standpipe extension 34B.

As noted above, the individual chambers 36 may be separately removable for repair or replacement. In addition, the transparent or translucent window 32 allows the level of liquid within each of the chambers to be visually observed without having to measure the amount of liquid accumulated in the chambers. The collection chambers 36 also prevent the continuous dripping of liquids from the drain mast and can be sized to contain sufficient liquid for a typical flight mission or between engine shutdowns. The push button standpipe arrangement is designed such that emptying the liquid collected in the chambers 36 does not result in excessive liquid running down the hand of the maintenance personnel. It will also be noted that if there is a particular drain line for which it is desired to allow the liquid to normally drain overboard without collection, the standpipe and spring assembly may be removed from that particular position within the drain mast assembly and simply allow the liquids to drain directly outward of the nacelle.

Figure 6:
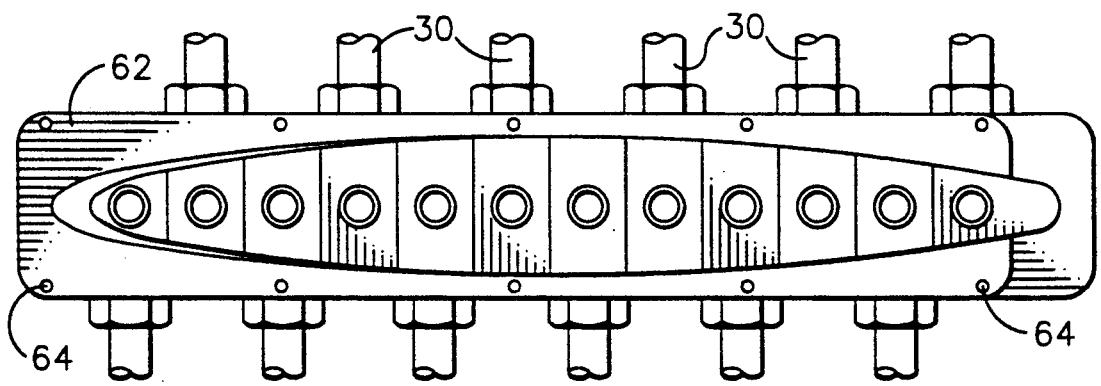
FIG. 6 is a bottom plan view of another form of the invention in which all drain chambers are concurrently removable.

It is also noted that the individual chambers 36 may also be removed as an assembly and an alternate mounting embodiment is shown in FIG. 6. In this embodiment, a circumscribing plate 62 overlays the chamber flanges 36A and is fastened to flange 28C via screws or bolts 64.

While the invention has been described in what is presently considered to be a preferred embodiment, various modifications will become apparent to those having skill in the art. It is intended therefore that the invention not be limited to the specific disclosed embodiment but be interpreted within the full spirit and scope of the appended claims.

What is claimed is:

1. An improved drain mast assembly for a gas turbine engine, the assembly being connected to an outer surface of a nacelle of the engine and having a plurality of liquid drain lines terminating within the assembly, the improvement comprising:
   a plurality of liquid collection chambers installed within the drain mast assembly, each of said chambers being coupled in liquid receiving relationship with a respective one of the liquid drain lines, each of the chambers collecting drain liquid from a respective one of the drain lines; and
   means for selectively draining the collected liquid from each of said chambers for identifying drain lines having relatively high drain rates.

2. The improvement of claim 1 wherein each of said chambers is separately removable from the drain mast assembly.

3. The improvement of claim 1 and including a transparent view window in each of said chambers for visually determining a volume of liquid therein.

4. The improvement of claim 1 wherein said draining means comprises a manually operational relief valve, said valve having a standpipe extending a preselected distance into said chamber for overflow draining of said chamber when liquid collected therein rises above said preselected distance.

5. The improvement of claim 4 wherein said standpipe is slidable between a first sealing position and a second draining position, said standpipe passing through a wall of said chamber and having a portion thereof extending outward of said chamber for manually depressing said standpipe into said draining position.

6. The improvement of claim 5 and including spring means in said chamber for urging said standpipe into said sealing position.

7. A liquid collection chamber for monitoring a leakage rate of a liquid from a seal within a gas turbine engine, the engine including a drain line for draining liquid from the seal to the collection chamber, the chamber comprising:
   a viewing window on at least one surface of the chamber for visually observing height of liquid in the chamber; and
   drain valve means extending through a bottom of the chamber for selectively draining collected liquid from the chamber, said drain valve means comprising a hollow standpipe extending to a preselected height in the chamber.

8. The chamber of claim 7 wherein said standpipe includes a portion extending below an outer surface of said bottom of said chamber and including a hole extending through a wall of said standpipe portion, said standpipe being vertically slidable through said bottom for positioning the hole within the chamber for draining of the chamber.

9. The chamber of claim 8 and including spring means coupled to said standpipe within said chamber for resiliently biasing said standpipe in a sealing position.

10. The chamber of claim 9 and including gauge lines on said viewing window for quantizing a volume of liquid in said chamber.

* * * * *